US 6,681,112 B1

(12) United States Patent
Schwarz et al.

(10) Patent No.: US 6,681,112 B1
(45) Date of Patent: Jan. 20, 2004

(54) HANDOVERS OF USER EQUIPMENT CONNECTIONS IN WIRELESS COMMUNICATIONS SYSTEMS (75) Inventors: Uwe Schwarz, Veikkola (FI); Peter Muszynski, Espoo (FI); Kari Rikkinen, Camberley (GB)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 10/213,444

(22) Filed: Aug. 7, 2002

Related U.S. Application Data (60) Provisional application No. 60/375,809, filed on Apr. 29, 2002, provisional application No. 60/375,813, filed on Apr. 29, 2002, provisional application No. 60/375,811, filed on Apr. 29, 2002, provisional application No. 60/375,831, filed on Apr. 29, 2002, provisional application No. 60/375,837, filed on Apr. 29, 2002, provisional application No. 60/375,810, filed on Apr. 29, 2002, provisional application No. 60/375,838, filed on Apr. 29, 2002, and provisional application No. 60/375,832, filed on Apr. 29, 2002.

(51) Int. Cl.[7] .................................................. H04Q 7/20
(52) U.S. Cl. ..................................................... 455/436
(58) Field of Search ................................ 455/436, 438, 455/439, 437, 422.1, 446, 500, 444; 370/329, 331, 328

(56) References Cited

U.S. PATENT DOCUMENTS 5,109,528 A * 4/1992 Uddenfeldt ................. 455/442
5,345,600 A * 9/1994 Davidson .................... 455/501
5,487,174 A * 1/1996 Persson ....................... 455/444
6,119,018 A * 9/2000 Kondo ........................ 455/522
6,507,741 B1 * 1/2003 Bassirat ...................... 455/440
2002/0090951 A1 * 7/2002 Kanagawa .................. 455/446
2003/0064729 A1 * 4/2003 Yamashita .................. 455/451
2003/0096610 A1 * 5/2003 Courtney et al. ........... 455/429

FOREIGN PATENT DOCUMENTS

WO       9319537        9/1993    ............ H04B/7/26

OTHER PUBLICATIONS

Ericsson, Technical Consideration Variable Duplex Technology, Document No. R4–020190, Jan. 28–Feb. 1, 2002.

* cited by examiner

Primary Examiner—William Trost
Assistant Examiner—Danh C Le
(74) Attorney, Agent, or Firm—Brown Raysman Millstein Felder Steiner (57) ABSTRACT An inter-frequency handover of a UE connection is performed in which the frequency of the uplink connection from the UE to a base station remains the same and the frequency of the downlink connection from the base station to the UE changes from a first downlink frequency to a second downlink frequency. A request for the handover is transmitted from the base station. The request containing information indicating the second downlink frequency and information indicating that the uplink frequency remains the same. In response to the request, the physical layer of the uplink connection is maintained while changing the downlink frequency from the first downlink frequency to the second downlink frequency.

35 Claims, 6 Drawing Sheets

HANDOVERS OF USER EQUIPMENT CONNECTIONS IN WIRELESS COMMUNICATIONS SYSTEMS

Applicants hereby claim the benefit of the filing date of the following provisional applications under 35 U.S.C. §119(e), the specification and drawings of which are hereby incorporated by reference in their entirety as if fully set forth herein:

1) Application No. 60/375,809 filed on Apr. 29, 2002;
2) Application No. 60/375,813 filed on Apr. 29, 2002;
3) Application No. 60/375,811 filed on Apr. 29, 2002;
4) Application No. 60/375,831 filed on Apr. 29, 2002;
5) Application No. 60/375,837 filed on Apr. 29, 2002;
6) Application No. 60/375,810 filed on Apr. 29, 2002;
7) Application No. 60/375,838 filed on Apr. 29, 2002; and
8) Application No. 60/375,832 filed on Apr. 29, 2002.

BACKGROUND OF THE INVENTION

1. Field of the Invention

The present invention generally relates to wireless communications. More particularly, the invention relates to handovers of user equipment (UE) under the control of a radio network controller (RNC) in a wireless communications system.

2. Description of the Related Art

In wireless communications systems, soft handovers are used to gradually transfer a user equipment (UE) connection from one base station to another base station without the user experiencing any interruption in communications. Hard handovers are used to, for example, switch between modes of operations or switch between base stations when a soft handover cannot be performed. In particular, inter-frequency hard handovers are used to hand over the connection between the UE and the radio access network from one frequency carrier or band to another. Although it may not always be apparent to the user, hard handovers typically involve some interruption in the connection between the UE and the base station(s).

The connection between the UE and the radio access network includes an uplink (UL) connection on a first carrier frequency and a downlink (DL) connection on a second carrier frequency different than the first carrier frequency. The UL connection may be with a first base station that is independent from a second base station used for the DL connection. (See WO 93/19537 for an example of such a system.) However, most wireless communication systems, including the Global System for Mobile Communications (GSM) and IS-95, are fixed duplex systems in which both of the UL and DL connections are with the same base station and use one of a plurality of predetermined duplex UL-DL pairs. Each 1:1 pair of UL and DL carriers has a constant, fixed offset between the UL and DL frequencies to prevent interference between base stations and between user equipment.

When the radio network controller wishes to perform an inter-frequency hard handover for a particular UE for any reason (such as interference, load, etc.), it identifies a new UL-DL duplex pair and the UL and DL frequencies for that particular UE are changed in tandem at the same time to the new UL-DL duplex pair. This handover procedure is performed and the entire duplex pair is changed even if it is only desired to change only one of the UL frequency or the DL frequency. It is not possible, for example, to keep the uplink connection uninterrupted and change only the downlink connection.

Figure 1:
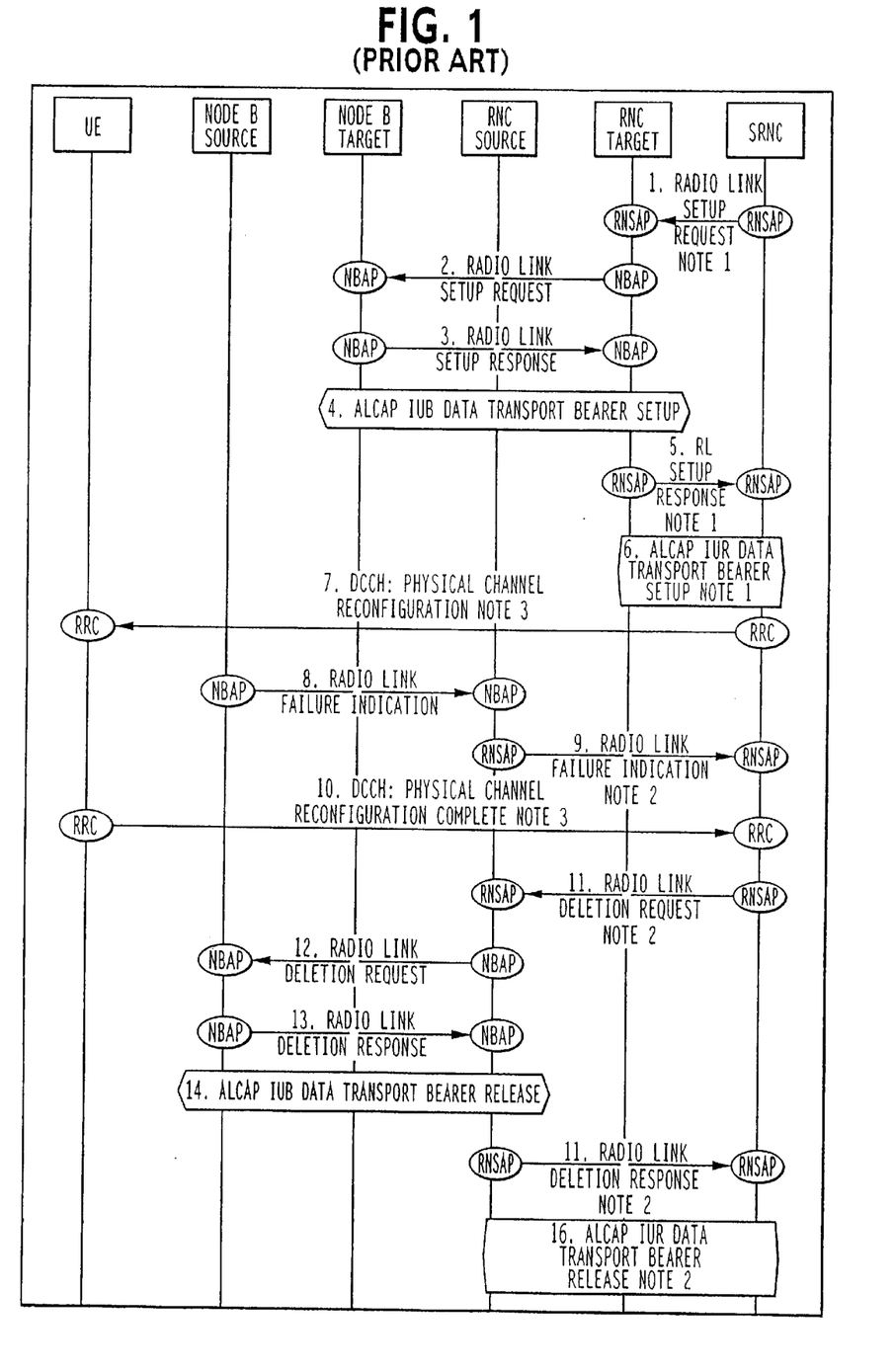
FIG. 1 illustrates the steps performed by a UTRAN network according to a prior art inter-frequency hard handover procedure.
Figure 2:
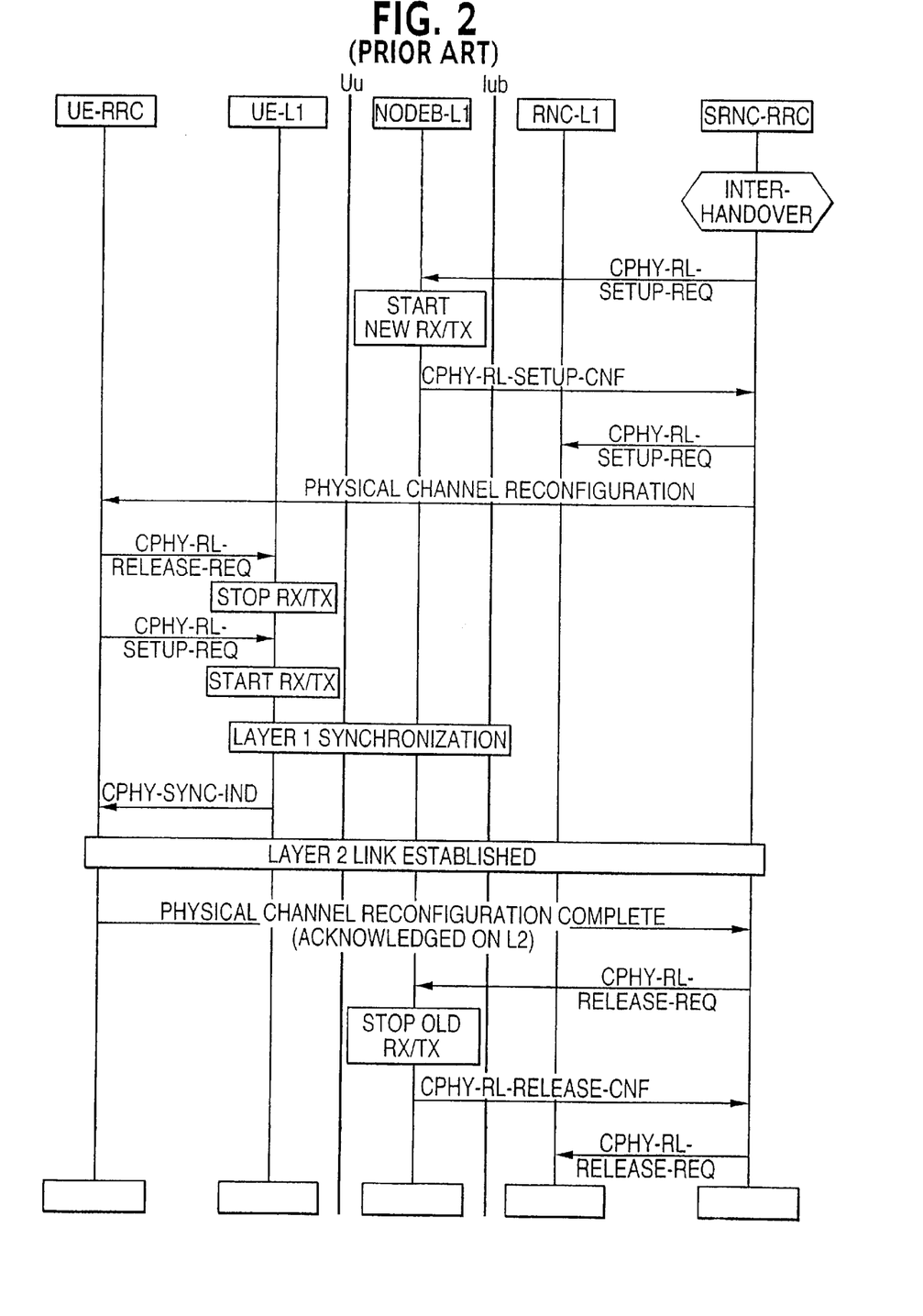
FIG. 2 shows the steps taken by a UE according to the prior art inter-frequency hard handover procedure shown in FIG. 1.

Prior art FIG. 1 illustrates the inter-frequency hard handover procedure performed in a network according to Release 4 of the specifications developed by the 3rd Generation Partnership Project (www.3gpp.org). See section 7.11 of 3GPP TS 25.931 v4.1.0 (2001-06) for a complete description of the hard handover. As shown by steps 7 and 10, the inter-frequency hard handover procedure includes a Physical Channel Reconfiguration procedure, which is itself an extensive procedure. See section 8.2.2 of 3GPP 25.331 v4.1.0 (2001-06). Prior art FIG. 2 illustrates the messages taken by the UE in the inter-frequency hardhandover. See also section 6.4 of 3GPP TS 25.303 v4.2.0 (2001-09). The inter-frequency hard handover according to Release 4 of the 3GPP specification always assumes a new allocation of the uplink carrier due to the pairing of the UL and DL carriers. Even when it is only necessary to change the carrier frequency for only one of the UL and DL connections, all of the steps shown in prior art FIGS. 1 and 2 (including the physical channel reconfiguration) will still be performed and the carrier frequency for the other connection will still be reallocated. The 3GPP handover procedure thus has the disadvantage that there will be unnecessary interruption while both of the carrier frequencies are re-allocated.

BRIEF SUMMARY

It is an object of a method according to the preferred embodiments of the invention to provide a handover procedure which does not contain the disadvantages of the prior art procedures when only one of the UL and DL connections is changed in the handover. In particular, the preferred embodiments allow the UL connection to be maintained and remain uninterrupted while only the DL connection is changed and resynchronized to a new carrier frequency. Thus, the preferred embodiments overcome the problems associated with the unnecessary allocation of a carrier frequency which does not change in the handover procedure.

It is a specific advantage of the handover procedure to speed up the handover in the case where one of the uplink or downlink frequency remains the same and the other frequency is changed. For example, in a handover where only the downlink connection changes and the uplink does not, the method maintains the uplink connection and the physical resources processing that support the uplink connection.

A first aspect of the invention concerns a method of executing an inter-frequency handover of a UE connection in which the frequency of the uplink connection from the UE to a base station remains the same and the frequency of the downlink connection from said base station to said UE changes from a first downlink frequency to a second downlink frequency, comprising: transmitting a request for said handover from said base station, the request containing information indicating the second downlink frequency and information indicating that the uplink frequency remains the same; and in response to the request, maintaining the physical layer of the uplink connection while changing the downlink frequency from said first downlink frequency to said second downlink frequency.

A second aspect of the invention concerns a method of executing an inter-frequency handover of a UE connection in which the frequency of the downlink connection from the UE to a base station remains the same and the frequency of the uplink connection from said base station to said UE changes from a first uplink frequency to a second uplink frequency, comprising transmitting a request for said handover from said base station, the request containing information indicating the second uplink frequency and information indicating that the downlink frequency remains the same; and in response to the request, maintaining the physical layer of the downlink connection while changing the up link frequency from said first uplink frequency to said second uplink frequency.

A third aspect of the invention concerns a method of triggering an inter-frequency handover of a UE connection in which the frequency of the uplink connection from the UE to a base station remains the same and the frequency of the downlink connection from said base station to said UE changes from a first downlink frequency to a second downlink frequency, comprising directly measuring the signal strength of an adjacent uplink carrier; determining the presence of interference from the adjacent uplink carrier on the basis of said measurement; if it is determined that interference is present on the-adjacent uplink carrier, transmitting a request for said handover from said base station, the request containing information indicating the second downlink frequency and information indicating that the uplink frequency remains the same; and in response to the request, maintaining the physical layer of the uplink connection while changing the downlink frequency from said first downlink frequency to said second downlink frequency.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto.

Like parts art identified with like designations throughout the drawings.

DETAILED DESCRIPTION OF THE PREFERRED EMBODIMENTS

Before beginning a detailed description of the preferred embodiments of invention, mention of the following is in order. The preferred embodiments of the invention are described with reference to an exemplary wireless communication system according to Release 4 of the specifications developed by the 3rd Generation Partnership Project. However, the preferred embodiments are not limited to implementation in a 3GPP wireless communication system. They may be practiced in any wireless communication system, including, but not limited to, FDMA, CDMA or TDMA type systems. The arrangement and embodiment of the exemplary 3GPP wireless communication system is shown in block diagram form and described in this application without excessive detail in order to avoid obscuring the invention, and also in view of the fact that specifics with respect to implementation of such a system may be highly dependent upon the circumstances. In other words, such specifics are variable but should be well within the purview of one skilled in the art. Where specific details are set forth in order to describe example embodiments of the invention, it should be apparent to one skilled in the art that the invention can be practiced without, or with variation of, these specific details.

Figure 3:
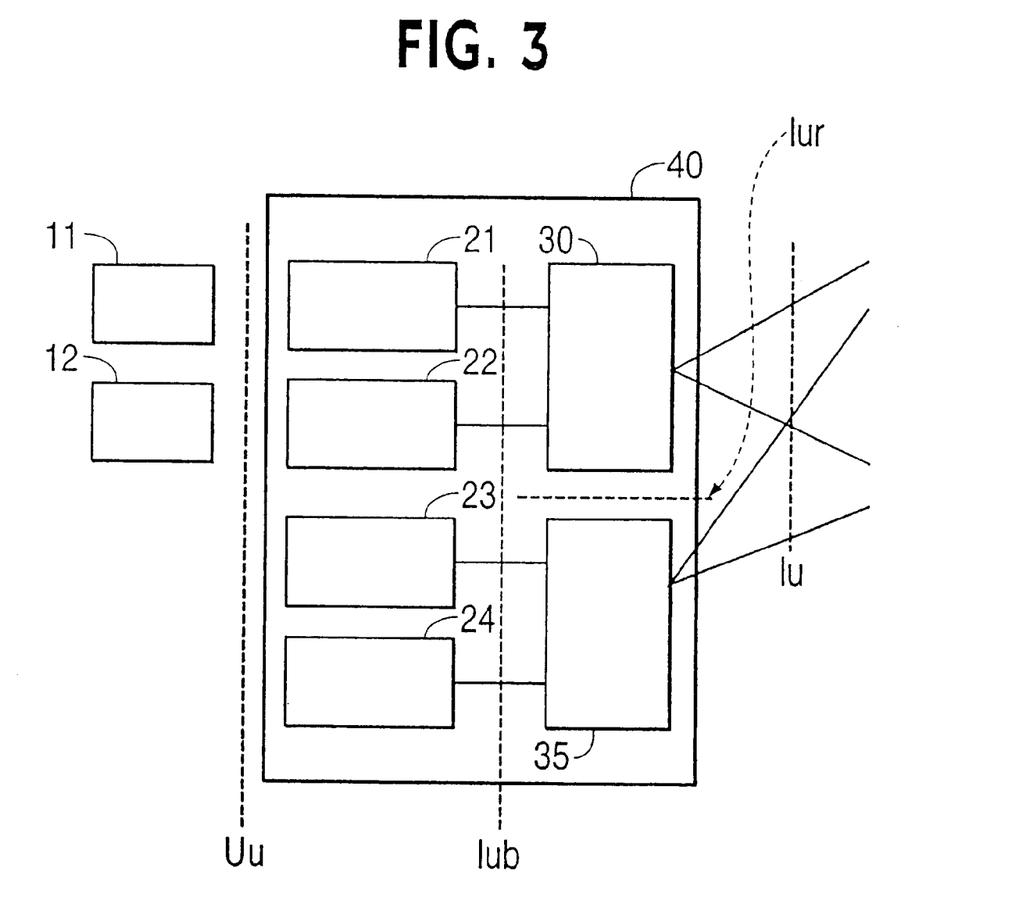
FIG. 3 illustrates an exemplary 3GPP wireless communication system in which the preferred embodiments of the invention may be practiced.

FIG. 3 is a block diagram of the architecture of an exemplary 3GPP wireless communication system. First user equipment (UE) 11 and second UE 12 are connected via a Uu radio interface to respective first and second base stations 21, 22 (called Node B in 3GPP specifications) of UTRAN 40. The base stations participate in radio resource signalling and management, and provide the UL and DL connections with UE 11 and 12. UTRAN 40 includes at least one base station controller 30 (called a Radio Network Controller (RNC) in 3GPP specifications) connected to the base station 21, 22 via a lub interface and is responsible for the management and the control of the radio resources in its domain (i.e., the base station controllers 21, 22 connected to it). RNC 30 may be a service access point for all services the UTRAN 40 provides to a core network (not shown). FIG. 3 also shows a second RNC 35 connected to base stations 23 and 24 via the lub interface. An lur interface is provided between RNC 30 and RNC 35. For ease of illustration, only two base station controllers are shown in FIG. 3. There may, of course, be any number of base stations and base station controllers in a mobile communication system.

Current 3GPP (3rd Generation Partnership Project) specifications define signalling protocols such as RANAP (Radio Access Network Application Part). The RANAP is a signalling protocol in the lu-interface that contains all control information specified for the Radio Network Layer used for UTRAN-related issues.

According to 3GPP TS 25.331 v4.1.0, the RRC management of RNC 30 can independently indicate the new target channel frequencies for the uplink and downlink in a handover. The RRC signaling message may contain separate information elements which respectively indicate the uplink frequency, the downlink frequency, etc. However, as described in this application, it is not possible to keep the uplink connection uninterrupted during the time necessary to change the downlink carrier frequency and perform resynchronization for the downlink connection.

Returning now to the previous hard handover procedure, section 8.2.2 of 3GPP TS 25.331 v4.1.0 states that UE 11 should perform physical channel reconfiguration procedure A set forth in Section 4.3.2.3 of 3GPP TS 25.214 when making an inter-frequency hard handover. Applying this procedure to cases where only the downlink is hanged, the procedure requires the UE 11 to terminate the downlink transmission, tune in to the new downlink frequency and try to synchronize to it. However, UE 11 must first interrupt the uplink connection and must not transmit on the uplink connection while this is being done. Thus, the inter-frequency hard handover always, by default, leads to an interruption on the uplink. Node B 21 must reacquire the uplink connection after the UE 11 starts transmitting again on the uplink connection.

The order of steps in the previous handover procedure is that the network starts downlink transmission on the new downlink frequency, UE 11 stops transmission on the uplink connection and tries to synchronize to the new downlink connection. Once UE 11 has found the new downlink connection and verified that the downlink connection is operating properly, it may then resume transmissions on the uplink connection and the base station 21 tries to reacquire the uplink transmission from UE 11 and if the uplink transmission is found, base station 21 provides signaling back to UE 11 confirming the uplink transmission.

As mentioned above, the 3GPP specifications do not account for the special case where frequency and other parameters of either the uplink connection or the downlink connection remains the same during the inter-frequency handover. According to the specifications, whenever one of the uplink or downlink frequencies is changed, by default, the network must perform the specified inter-frequency hard handover procedure. There is no way to avoid the additional unnecessary steps in the procedure.

The current 3GPP specifications do not indicate what happens if one of the uplink or downlink remains the same. There is only a single hard handover procedure which is invoked whenever at least one of the uplink or downlink frequencies needs to be changed. Once the hard handover procedure is invoked and starts, it is always the same and the same steps are included in it. The network sets up new physical resources on Node B 21 for the new uplink and downlink transmissions and then signals the UE 11 to go to the new frequencies. The synchronization process starts where the UE 11 tries to establish the new downlink connection, interrupts the uplink connection and the network searches for the uplink connection, etc. In the network signaling, new resources will be setup for the uplink connection even if the frequency remains the same and it is possible to use the old physical resources.

The preferred embodiments of the invention provide a handover procedure which, in cases where only one of the frequency for the downlink connection is changed, the uplink connection is maintained during the handover so that the physical layer of the connection is not disrupted or terminated. The physical hardware resources, of the base station remain allocated to the uplink connection. Thus, the base station remains capable of receiving transmissions on the uplink connection at the physical layer even though the UE may not be transmitting.

Figure 4:
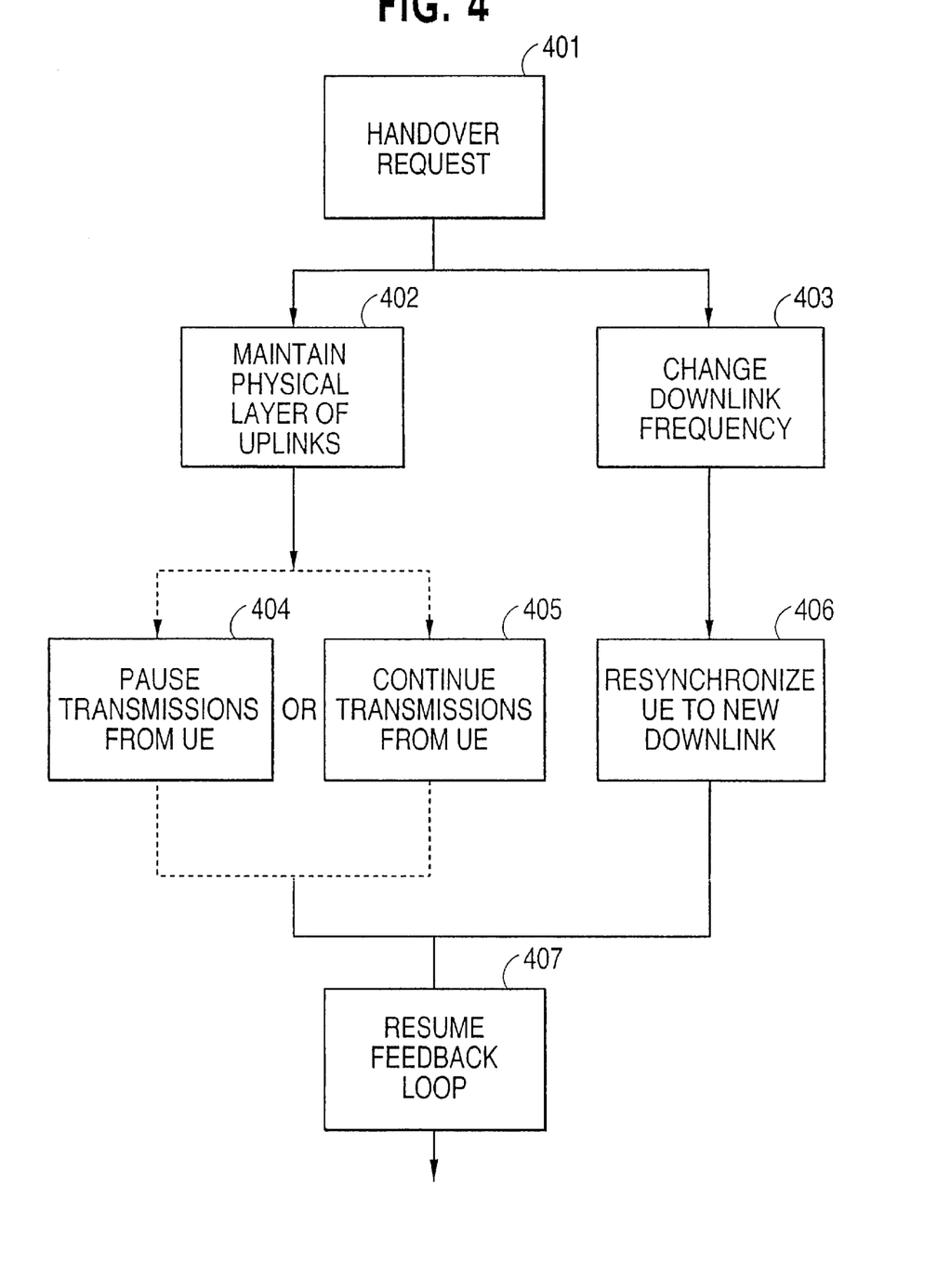
FIG. 4 is a flowchart indicating the steps of the handover procedure according to the preferred embodiment of the invention.

FIG. 4 is a flowchart illustrating the general steps of the handover procedure applicable to the preferred embodiments of the invention. First, the RNC 30 decides that it is necessary to perform an inter-frequency handover in which the uplink frequency remains the same while the downlink frequency changes (step 401) and provides a handover request signaling message to UE 11. Preferably the handover request contains two separate items of information. First information indicating that the uplink frequency remains the same and second information indicating the new downlink frequency. As explained, the physical layer of the uplink is maintained (402) at the same time that the downlink frequency is changed (403). After the downlink frequency is changed, UE 11 is resynchronized to the new downlink connection (406). Preferably, UE 11 is resynchronized to the new downlink connection using the same synchronization procedure already established for other procedures in UE 11. This synchronization procedure may be that described in U.S. Provisional Patent Application No. 60/375,811 filed on Apr. 29, 2002 and entitled "Fast Procedures in (Chip) Synchronized Co-Sited Carriers", which is hereby incorporated by reference. During resynchronization, the transmissions from UE 11 on the uplink may be paused (405) or continued (406). After resynchronization is completed, the feedback loop, which was lost during the handover is resumed (407).

Even though UE 11 may continue or pause transmission on the uplink connection, it will be affected by the missing feedback loop during the time period in which transmissions are not possible on the downlink connection because of the changing carrier frequency and the need for resynchronization of the downlink connection. The handover may apply an optimized power control feature to minimize the recovery period after this downlink transmission gap. The handover optimized power control feature may be similar to known compressed mode power control mechanisms or it may be quite different. For example, if transmissions from UE 11 on the uplink are continued, the network may estimate changes in radio propagation to allow a faster adoption to optimal working of the feedback loop. The interruption time in a handover according to the preferred embodiments is shorter compared to the conventional inter-frequency handover and the pathloss of target cell is known because the base station is co-sited.

The new downlink connection will have a new chip synchronized signal from the base station and the UE 11 has to be resynchronized with the new signal. Preferably, the resynchronization of the downlink connection follows the same rules for asynchronous base stations established in 3GPP TS 25.214. In particular, it uses the system frame number (SFN) timing method to accomplish the resynchronization. In 3GPP systems, there is no synchronization of all the base stations such as in the Global Position System (GPS). The base stations all run according to their own clocks and have their own system frame numbering and timing, and associated drift. The SFN is used when making handovers between different cells to determine the drift between the base stations. Signaling information is then sent back to the network so that it positions the frame boundaries accordingly and the UE can demodulate transmissions on the downlink connection.

Unlike the previous procedure, transmissions on the uplink connection remain possible during and shortly after the time period in which the downlink connection is interrupted and changed. The uplink transmissions may continue or pause (this option may be set by the UE or the network), but they will not be fully functional and will be affected by the missing feedback loop in the downlink connection used, for example, for power control. The options for uplink transmission during this time period may be set by the UE or the network or by some coordination of both. A first option is to interrupt the uplink transmission, preferably similar to the manner in which this is done during a compressed mode gap. A second option is to continue uplink transmissions, preferably similar to the manner done for only downlink compressed mode gap. Also, another method of adjusting the UE power on the uplink may be used, such as slowing decreasing the power of the uplink transmission. Preferably, UE 11 skips extra downlink measurements before these uplink transmissions.

The triggering of radio link (RL) failure message is preferably prevented. This may be accomplished by, for example, temporarily tolerating a number of out-of-sync indications which is relatively high compared to the number of out-of-sync indications which would normally be tolerated. For example, according to 3GPP TS 25.433: "N_OUTSYNC_IND"=1.256 frames, i.e. up to 2.56 seconds).

There are a number of advantages to a handover procedure according to the preferred embodiments of the invention. Most obviously, the handover is accomplished more quickly than previous handover procedures. The physical layer of the uplink connection doesn't need to be terminated and transmissions can continue on the uplink connection. The new downlink connection is available more quickly and power control of the uplink connection can resume as soon as synchronization of the new downlink connection is achieved. Also, power control of the downlink on the new carrier frequency can start as soon as downlink synchronization is achieved—with no downlink measurement before uplink transmission. The power control preamble can be replaced by a power recovery algorithm. Unlike the previous handover procedure, no new uplink channel estimation is needed.

The limited availability of spectrum is a constant concern for wireless communications. Operators of cellular systems carefully plan their systems in order to provide the maximum performance possible within the fixed frequency bands allocated to them.

Figure 5:
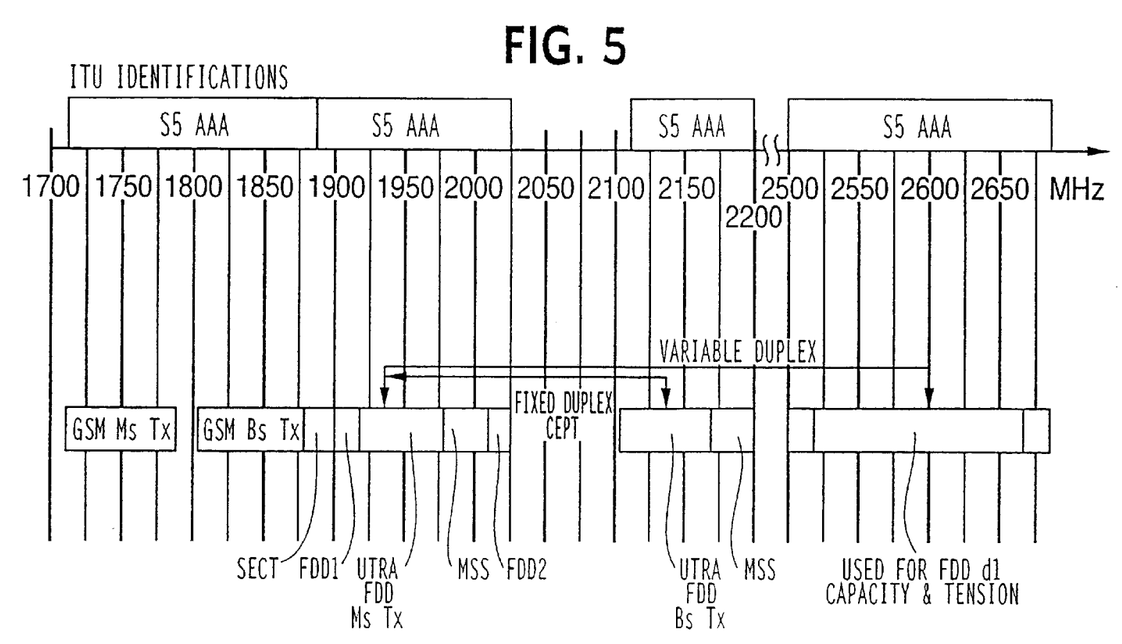
FIG. 5 illustrates the allocation of a proposed extension band to which the preferred embodiment may be applied.

In a particular embodiment of the invention, the handover procedure is advantageously applied to additional available frequency spectrum. Specifically, among new extension bands being discussed, is an extension band between 2500 and 2690 MHz identified as ITU S5.AAA in FIG. 5. Different scenarios for use of this additional extension band are possible. Noting that the extension band is not wide enough to support multiple duplex pairs having the conventional duplex separation of 190 Mhz, a first scenario is that all of the carriers in the extension band are used only for additional downlink carriers. In such a scenario, UE connections pertaining to one particular core band UL carrier can be carried on one or more than one DL carrier. However, each radio link uses at most one carrier (either in one of the core bands or in the extension band) at any point in time. As shown in FIG. 5, variable duplexing in the UE is used to access the additional DL carrier(s) in the extension band outside the core bands. The handover according to the above embodiments may be applied, along with variable duplex technology, to change the downlink frequency from the core band to the extension band.

Figure 6:
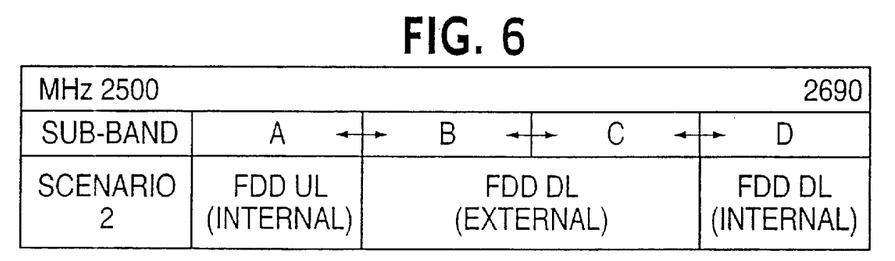
FIG. 6 illustrates a second allocation scenario of a proposed extension band.

In a second scenario illustrated in FIG. 6, it is proposed that there be a plurality of sub-bands for UL and DL carriers which are adjacent to each other in the extension band. It is assumed that the (missing) UL part to the FDD (external) DL carriers within the extension band is implemented by using UL carriers from the core bands and variable duplexing. Thus, only existing UMTS core band operators will be able to use that part of the extension band. The UL/DL "internal portions" of the spectrum shall be used by, for example, new (or also possible existing) operators autonomously, i.e., without the necessity to use core band carriers.

It is proposed that the new extension band can be used by UTRAN for load balancing or coverage. In either scenario, the inter-frequency band handovers become essential for efficient operation and use of the spectrum. In particular, the handover according to the preferred embodiment can be used as an effective interference escape mechanism in the second scenario since it is faster than the previous handover procedures.

This handover may be triggered by a unique, method to detect UE to UE adjacent channel interference. Such an interference can happen at the border between FDD UL (internal) and FDD DL (external). This interference does not occur in conventional fixed duplex wireless communication systems because the fixed distance between the carriers avoided the problem. Also, the interference is small enough not to be identified as a dead zone area by current methods, but it is large enough to cause inefficient use of base station resources. Adjacent UE-UE interference can potentially create a large area of interference due to the fact that there are many mobiles i.e. many sources of interference. Thus, the number of significantly interfered mobiles can also be high summing up the inefficient use of base station resources. Early detection of UE to UE interference and subsequent handovers therefore improves spectral efficiency.

Figure 7:
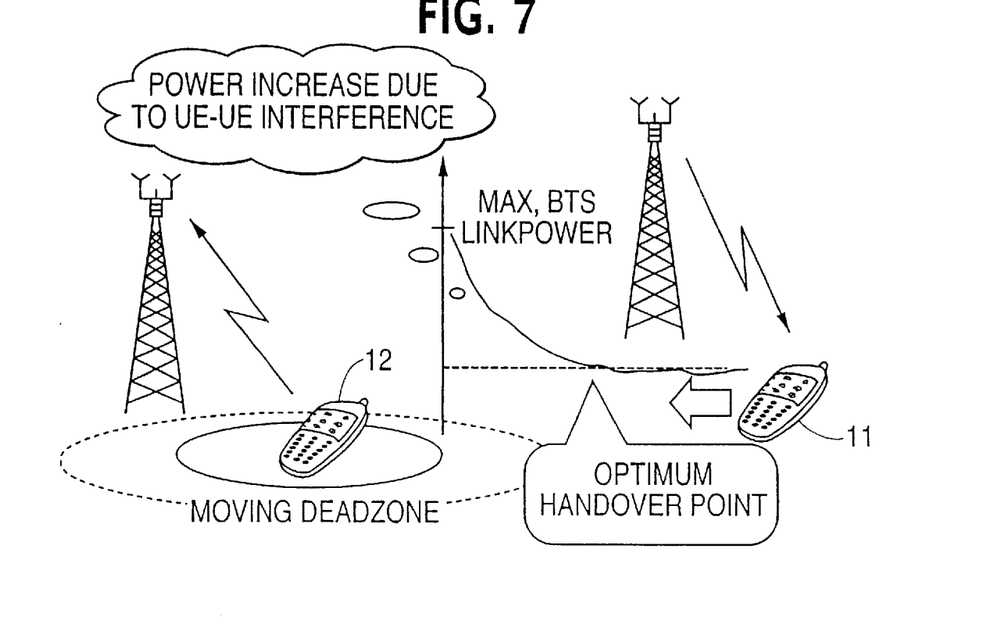
FIG. 7 illustrates the problem of UE-UE interference.

The problem is illustrated in FIG. 7. A first UE 12 transmitting in an uplink carrier frequency adjacent to the downlink carrier frequency of another UE 11 can interfere with that adjacent downlink frequency and possibly create dead zones. The result will be inefficient use of base station resources, i.e. additional base station transmission power, before the dead zone is reached. The UE 11 can not distinguish the dead zone from the edge of the base station's cell. But in case of dead zones, the inefficient use of base station resources around the dead zones is easily avoided by performing a handover to a non-interfered downlink carrier according to the preferred embodiments. Efficient use of base station resources allows high throughput and signal-to-interference ratio in packet switched services. It also allows more UEs to be served with available base station transmission power.

Figure 8:
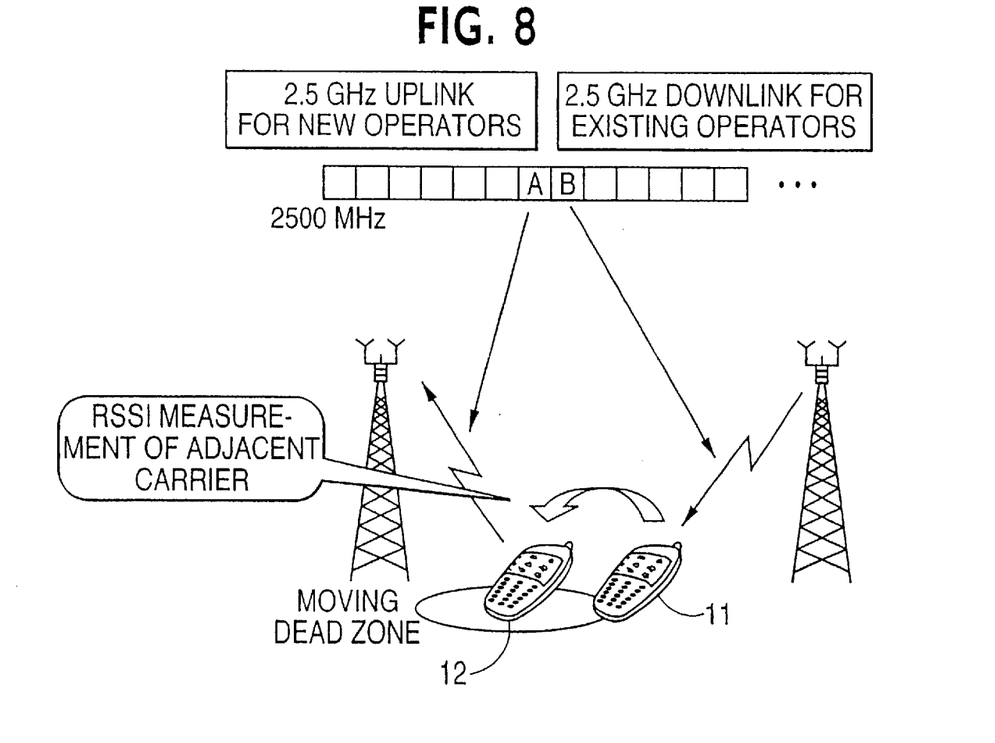
FIG. 8 illustrates a method of detecting adjacent channel interference to trigger an interference escaping handover.

A variant of compressed mode measurement can be made to detect the interference and trigger an interference escaping handover, but a preferred method is shown in FIG. 8. The preferred trigger method for the handover consists of separate UE measurements directly on the adjacent UL carrier(s). UE 11 on carrier(s) "B" measures directly the signal strength (RSSI) of the adjacent UL carrier(s) "A". (The term "adjacent" here also includes 2nd adjacent carriers, $3^{rd}$ adjacent carriers, and optionally includes the guard band separation associated with the carriers in case any one or more of the 2nd adjacent carriers, $3^{rd}$ adjacent carriers, and/or guard band separation is interfering too.) UE 12 can optionally measure at the midpoint (or any point in between) of the two adjacent carriers instead of measuring both separately so that the required measurement time is reduced. RSSI measurements are very fast (1–2 time slots) and can be done efficiently without switching to compressed mode.

This trigger method allows a timely detection of UE to UE interference ("moving dead zones") and early interference escaping handovers to non-interfered DL carriers. Thus, from the UE-UE interference point of view, adjacent operation of FDD UL and DL is enabled without inefficient use of the downlink carrier. Handovers according to the preferred embodiments are fast and efficient (no CM measurements required). Also, guard bands are not necessary, from the UE-UE interference point of view, resulting in higher spectral efficiency.

In summary, handovers according to the preferred embodiments can be done faster than inter-frequency hard handovers (due to comparable pathloss of co-sited DL carriers, DL synchronization, known SFN) and thus the missing feedback is minimized. The pathloss of the target cell can be estimated because the new downlink channel that the UE has to synchronize to is coming from the same site (base station); there is only a different frequency for the channel. For example, radio transmissions at 2.5 GHz experience about 3 dB stronger attenuation than radio transmissions at 2.1 GHz. The transmissions from the very same base station can be synchronized which means that the UE can be provided with information indicating the synchronization status of the new cell including the system frame number (SFN). This procedure can be done very fast because the channel estimation of all the parameters in the UE will converge very rapidly because the parameters are the same. The handovers according to the preferred embodiments are also faster than the previous inter-frequency hard handovers because it is not necessary to disrupt the uplink connection and the physical hardware resources in the network which demodulate the uplink do not have to be reallocated and reserved. Also, the handovers according to the preferred embodiments avoid the problem that, if there are terrestrial connections between the base station and the radio network controller for the uplink, it will take time to reallocate those connections. They preclude unnecessary things from happening in the network, such as signaling, resource reservations, etc, that occurred with previous handovers. By maintaining the uplink physical resources at the connection that will speed up the handover process.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A method of executing an inter-frequency handover of a UE connection in which the frequency of the uplink connection from the UE to a base station remains the same and the frequency of the downlink connection from said base station to said UE changes from a first downlink frequency to a second downlink frequency, comprising:

transmitting a request for said handover from said base station, the request containing information indicating the second downlink frequency and information indicating that the uplink frequency remains the same; and in response to the request, maintaining the physical layer of the uplink connection while changing the downlink frequency from said first downlink frequency to said second downlink frequency.

2. A method in accordance with claim 1, wherein the information indicates a second downlink frequency which is in a different band than the first downlink frequency.

3. A method in accordance with claim 2, wherein said different band is an extension band which includes frequencies of at least 2.5 GHz.

4. A method in accordance with claim 1, wherein downlink connection at the first downlink frequency and the downlink connection at the second downlink frequency both contain synchronization information.

5. A method in-accordance with claim 4, wherein said synchronization information is used by the UE to save measurements and to accelerate said handover.

6. A method in accordance with claim 4, wherein said synchronization information includes system frame numbering.

7. A method in accordance with claim 4, wherein said synchronization information includes information indicating that the downlink connection at the second downlink frequency is chip and frame synchronized with the downlink connection at the first downlink frequency.

8. A method in accordance with claim 1, wherein the first downlink connection and the second downlink connection have the same cell coverage.

9. A method in accordance with claim 1, wherein transmissions on the uplink connection are paused while the downlink connection is changed from the first downlink frequency to the second downlink frequency.

10. A method in accordance with claim 1, wherein transmissions on the uplink connection are continued while the downlink connection is changed from the first downlink frequency to the second downlink frequency.

11. A method in accordance with claim 1, wherein a feedback control loop is discontinued during the handover and is resumed after the handover is completed.

12. A method in accordance with claim 1, wherein said base station maintains the processing resources related to said uplink connection during the execution of said handover.

13. A method in accordance with claim 1, wherein said base station maintains the UL terrestrial connections towards the RNC related to said uplink connection during the execution of said handover.

14. A method of executing an inter-frequency handover of a UE connection in which the frequency of the downlink connection from the UE to a base station remains the same and the frequency of the uplink connection from said base station to said UE changes from a first uplink frequency to a second uplink frequency, comprising:

transmitting a request for said handover from said base station, the request containing information indicating the second uplink frequency and information indicating that the downlink frequency remains the same; and in response to the request, maintaining the physical layer of the downlink connection while changing the uplink frequency from said first uplink frequency to said second uplink frequency.

15. A method in accordance with claim 14, wherein the information indicates a second uplink frequency which is in a different band than the first uplink frequency.

16. A method in accordance with claim 15, wherein said different band is an extension band which includes frequencies of at least 2.5 GHz.

17. A method in accordance with claim 14, wherein uplink connection at the first uplink frequency and the uplink connection at the second uplink frequency both contain synchronization information.

18. A method in accordance with claim 17, wherein said synchronization information is used by the UE to save measurements and to accelerate said handover.

19. A method in accordance with claim 17, wherein said synchronization information includes system frame numbering.

20. A method in accordance with claim 17, wherein said synchronization information includes information indicating that the downlink connection at the second downlink frequency is chip and frame synchronized with the downlink connection at the first downlink frequency.

21. A method in accordance with claim 14, wherein the first uplink connection and the second uplink connection have the same cell coverage.

22. A method in accordance with claim 14, wherein transmissions on the downlink connection are paused while the uplink connection is changed from the first uplink frequency to the second uplink frequency.

23. A method in accordance with claim 14, wherein transmissions on the downlink connection are continued while the uplink connection is changed from the first uplink frequency to the second uplink frequency.

24. A method in accordance with claim 14, wherein a feedback control loop is discontinued during the handover and is resumed after the handover is completed.

25. A method of triggering an inter-frequency handover of a UE connection in which the frequency of the uplink connection from the UE to a base station remains the same and the frequency of the downlink connection from said base station to said UE changes from a first downlink frequency to a second downlink frequency, comprising:

directly measuring the signal strength of an adjacent uplink carrier;

determining the presence of interference from the adjacent uplink carrier on the basis of said measurement;

if it is determined that interference is present on the adjacent uplink carrier, transmitting a request for said handover from said base station, the request containing information indicating the second downlink frequency and information indicating that the uplink frequency remains the same; and     in response to the request, maintaining the physical layer of the uplink connection while changing the downlink frequency from said first downlink frequency to said second downlink frequency.

26. A method in accordance with claim 25, wherein the information indicates a second downlink frequency which is in a different band than the first downlink frequency.

27. A method in accordance with claim 26, wherein said different band is an extension band which includes frequencies of at least 2.5 GHz.

28. A method in accordance with claim 25, wherein downlink connection at the first downlink frequency and the downlink connection at the second downlink frequency both contain synchronization information.

29. A method in accordance with claim 28, wherein said synchronization information is used by the UE to save measurements and to accelerate said handover.

30. A method in accordance with claim 28, wherein said synchronization information includes system frame numbering.

31. A method in accordance with claim 28, wherein said synchronization information includes information indicating that the downlink connection at the second downlink frequency is chip and frame synchronized with the downlink connection at the first downlink frequency.

32. A method in accordance with claim 25, wherein the first downlink connection and the second downlink connection have the same cell coverage.

33. A method in accordance with claim 25, wherein transmissions on the uplink connection are paused while the downlink connection is changed from the first downlink frequency to the second downlink frequency.

34. A method in accordance with claim 25, wherein transmissions on the uplink connection are continued while the downlink connection is changed from the first downlink frequency to the second downlink frequency.

35. A method in accordance with claim 25, wherein a feedback control loop is discontinued during the handover and is resumed after the handover is completed.

* * * * *

UNITED STATES PATENT AND TRADEMARK OFFICE
CERTIFICATE OF CORRECTION

PATENT NO. : 6,681,112 B1
DATED : January 20, 2004
INVENTOR(S) : Uwe Schwarz et al.

It is certified that error appears in the above-identified patent and that said Letters Patent is hereby corrected as shown below:

Title page,
Item [56], References Cited, U.S. PATENT DOCUMENTS, please insert the following:
-- 6,111,864     8/2000  Kabasawa      370/332 --.

Signed and Sealed this

Twenty-fifth Day of January, 2005

JON W. DUDAS
*Director of the United States Patent and Trademark Office*